(12) United States Patent
Chang

(10) Patent No.: US 12,216,023 B2
(45) Date of Patent: Feb. 4, 2025

(54) TESTING MACHINE FOR TIRES

(71) Applicant: EKTRON TEK CO.,LTD., Changhua County (TW)

(72) Inventor: Yau Dong Chang, Changhua County (TW)

(73) Assignee: EKTRON TEK CO., LTD., Changhua County (TW)

( * ) Notice: Subject to any disclaimer, the term of this patent is extended or adjusted under 35 U.S.C. 154(b) by 331 days.

(21) Appl. No.: 17/942,826

(22) Filed: Sep. 12, 2022

(65) Prior Publication Data

US 2024/0085275 A1 Mar. 14, 2024

(51) Int. Cl.
  *G01M 17/02* (2006.01)
  *B60C 25/00* (2006.01)
  *G01N 3/02* (2006.01)
  *G01N 19/00* (2006.01)

(52) U.S. Cl.
  CPC ........... *G01M 17/02* (2013.01); *B60C 25/002* (2013.01); *G01M 17/021* (2013.01); *G01N 3/02* (2013.01); *G01N 19/00* (2013.01)

(58) Field of Classification Search
  CPC .... G01M 17/02; G01M 17/021; B60C 25/002
  See application file for complete search history.

(56) References Cited

U.S. PATENT DOCUMENTS 3,662,597 A * 5/1972 DeGhetto ............. G01M 17/02
  73/146

FOREIGN PATENT DOCUMENTS

DE 102008037356 A1 * 3/2010 ............ G01M 17/02
KR 20120092965 A * 8/2012

* cited by examiner

Primary Examiner — Jill E Culler

(57) ABSTRACT

A testing machine for tires has a base, a first slider, a second slider and a brake arm. The tire testing machine can test the tire's tread and bead lip at the same time, and then obtain the test data of the tire's plunger requirements and the ability to remove the lip, which can effectively reduce the time and labor for the tire's replacement and transfer cost, thereby improving the test efficiency of the tire, and helping to improve the accuracy of test data integration and analysis, and through the design feature of one machine, it can also reduce the cost of machine purchase and the doubt about placing the machine space, which have substantial effects of practicality and convenience.

3 Claims, 12 Drawing Sheets

TESTING MACHINE FOR TIRES

BACKGROUND OF INVENTION

Field of Invention

The present invention relates to a testing machine for tires and more particularly to a testing machine for tires capable of performing two different tests.

Description of the Related Art

Currently, tires have become an indispensable component of various mobile vehicles, it can provide a smooth and efficient means of movement in a rotating way. However, the quality of the tire affects the stability, comfort and safety of the vehicle during driving. In order to control the quality of the tire, it is necessary to measure a number of data on the tire for continuous improvement, so as to manufacture the tire that is safe and durable. However, the typical tire testing machines are nothing more than to test the strength of the tire tread, wheel wall and bead lip, but each type of the tire testing machines only performs its own single type of test. After the tire has been tested for a single type of test, the tire needs to be removed and transferred to another test machine for another different testing, which not only prolongs the tire testing time, but also requires manpower to disassembly and transfer, which greatly reduces the efficiency of the tire test and increases labor costs.

In addition, in order to perform every test on the tire test it is necessary to purchase multiple test machines to meet various test requirements, which will not only increase the cost of machine purchase, but also easily occupy the space of the factory because most of the test machines are large machines, causing affects the efficiency of the tire test.

Therefore, it is desirable to provide a testing machine for tires to mitigate and/or obviate the aforementioned problems.

SUMMARY OF THE INVENTION

An objective of present invention is to provide a g testing machine for tires which is capable of improving the above-mention problems.

In order to achieve the above mentioned objective, a testing machine for tires has a base, a first slider, a second slider and a brake arm. The base has a horizontal track, a first driving member, a second driving member, a testing device installed at an end of the horizontal track. The testing device is supported by a plurality of support columns above the horizontal track. A testing space is defined between the testing device and the horizontal track. The testing device has a longitudinal cylinder and a telescopic rod driven by the longitudinal cylinder. A sensor is mounted on an end of the telescopic rod and having a probe needle or a probe base. The first slider is slibably mounted on the horizontal track of the base and driven in the testing space by the first driving member, the first slider has an L-shaped swing arm and a first driving motor capable of making the L-shaped swing arm to swing through 90°. An end of the L-shaped swing arm has a tire securing axis and a second driving motor driving the tire securing axis, the second driving motor is capable of driving the L-shaped swing arm to rotate the tire securing axis to a horizontal or a vertical position. A second slider is slibably mounted on the horizontal track opposite the testing space and driven by the second driving member. The second slider has a standing column with a vertical track and a screw at an end parallel with the vertical track, and the screw also has a third driving motor at an end. The brake arm has a counterweight end, an operating end and a lift slider between the counterweight end and the operating end. The counterweight end has a first rail, a third driving member and a counterweight connected to the third driving member and moveable along the first rail. The operating end has a second rail, a fourth driving member and a bead unseating seat connected to the fourth driving member and moveable along the second rail. The bead unseating seat has a clamp. The lift slider is mounted onto the brake arm via an axis, such that the counterweight end arm and the operating end of the brake are capable of swinging around the axis, the lift slider connected to the screw and driven by the third driving motor to move along the vertical track of the standing column to control movement of the brake arm.

Other objects, advantages, and novel features of invention will become more apparent from the following detailed description when taken in conjunction with the accompanying drawings.

DETAILED DESCRIPTION OF THE PREFERRED EMBODIMENT

Figure 8:
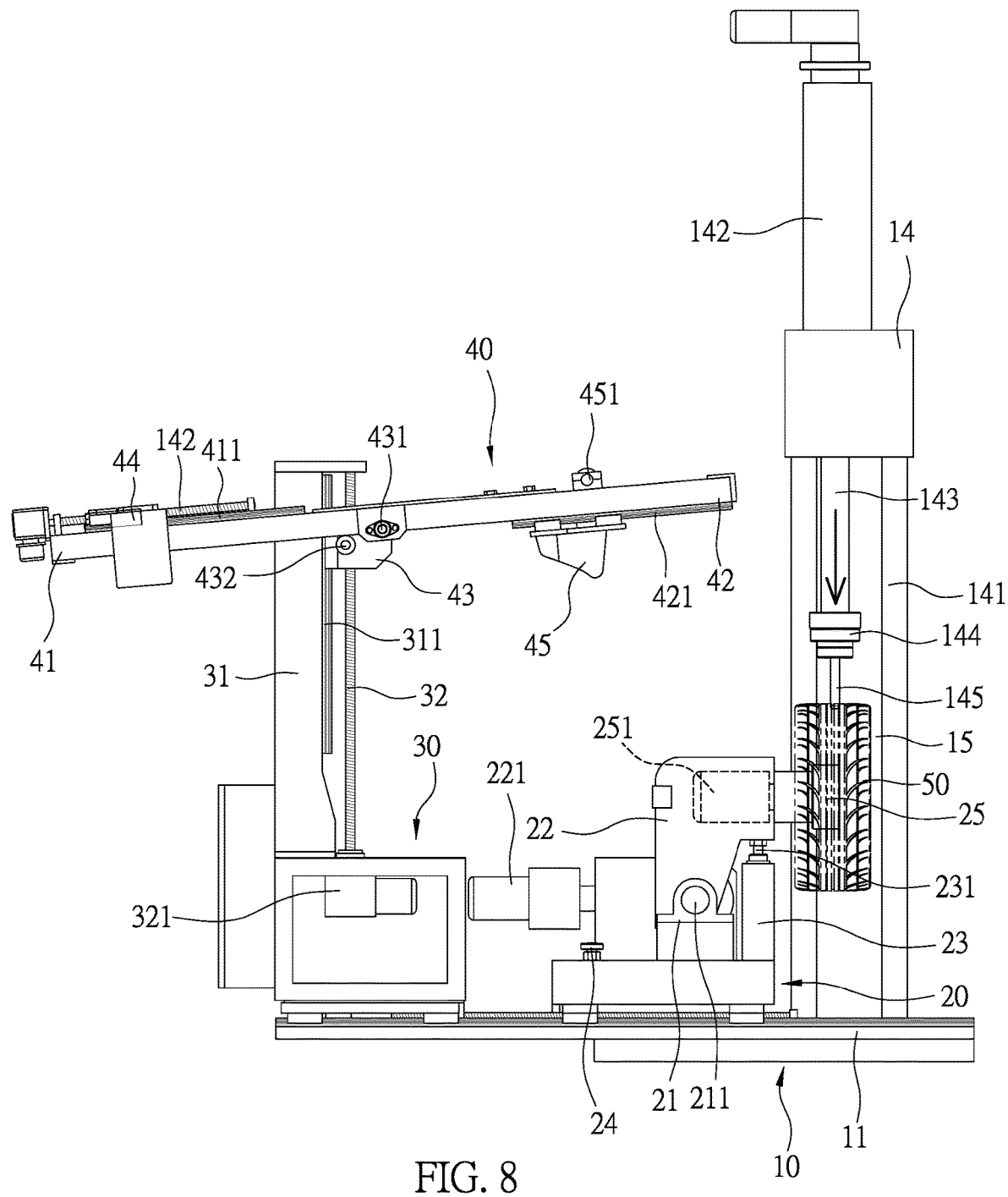
FIG. 8 is a schematic drawing of the testing device pressing tread according to the present invention.
Figure 9:
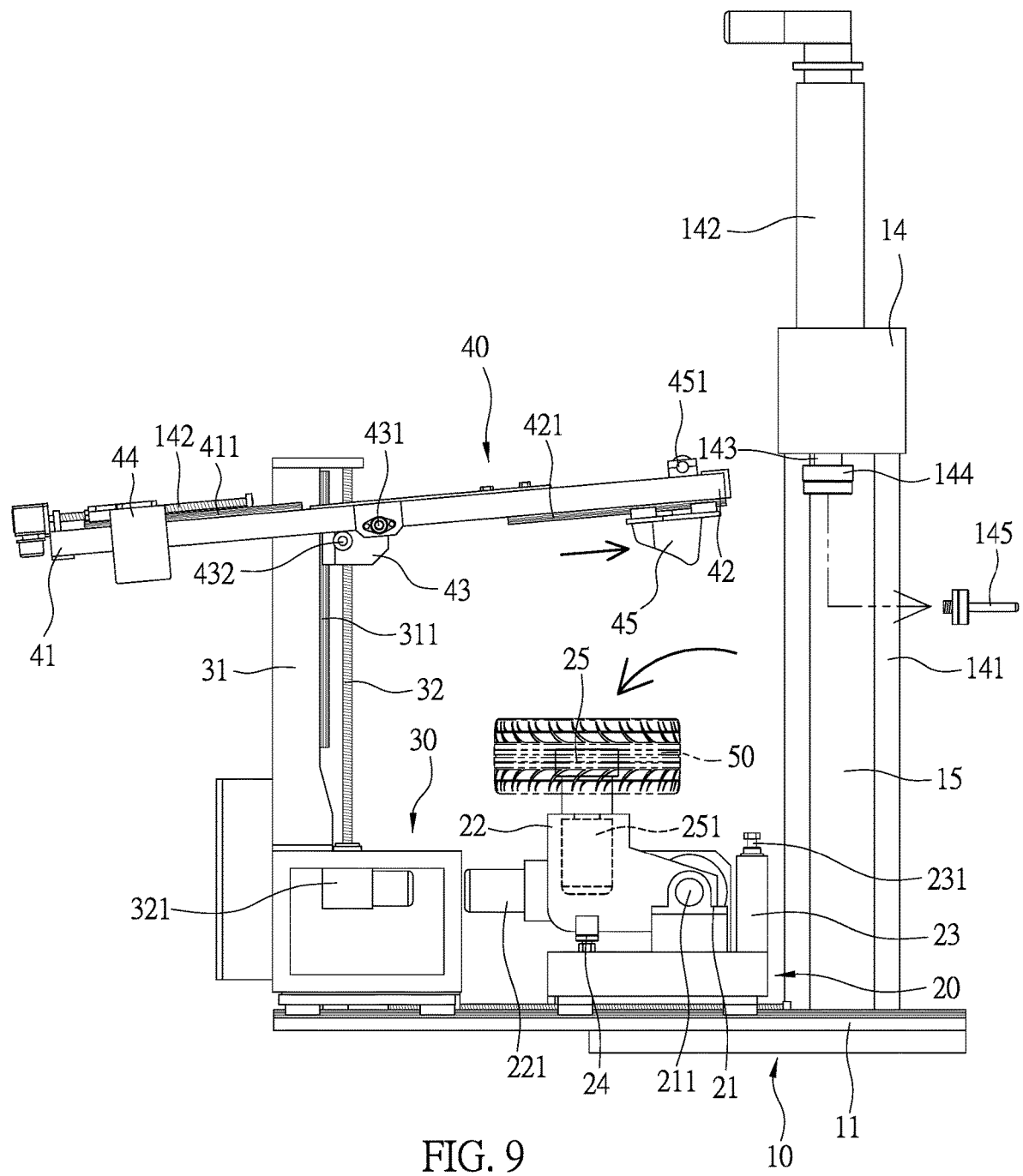
FIG. 9 is a schematic drawing of turning over the L-shaped swing arm and replacing the probe base to perform a tire bead unseating test according to the present invention.
Figure 10:
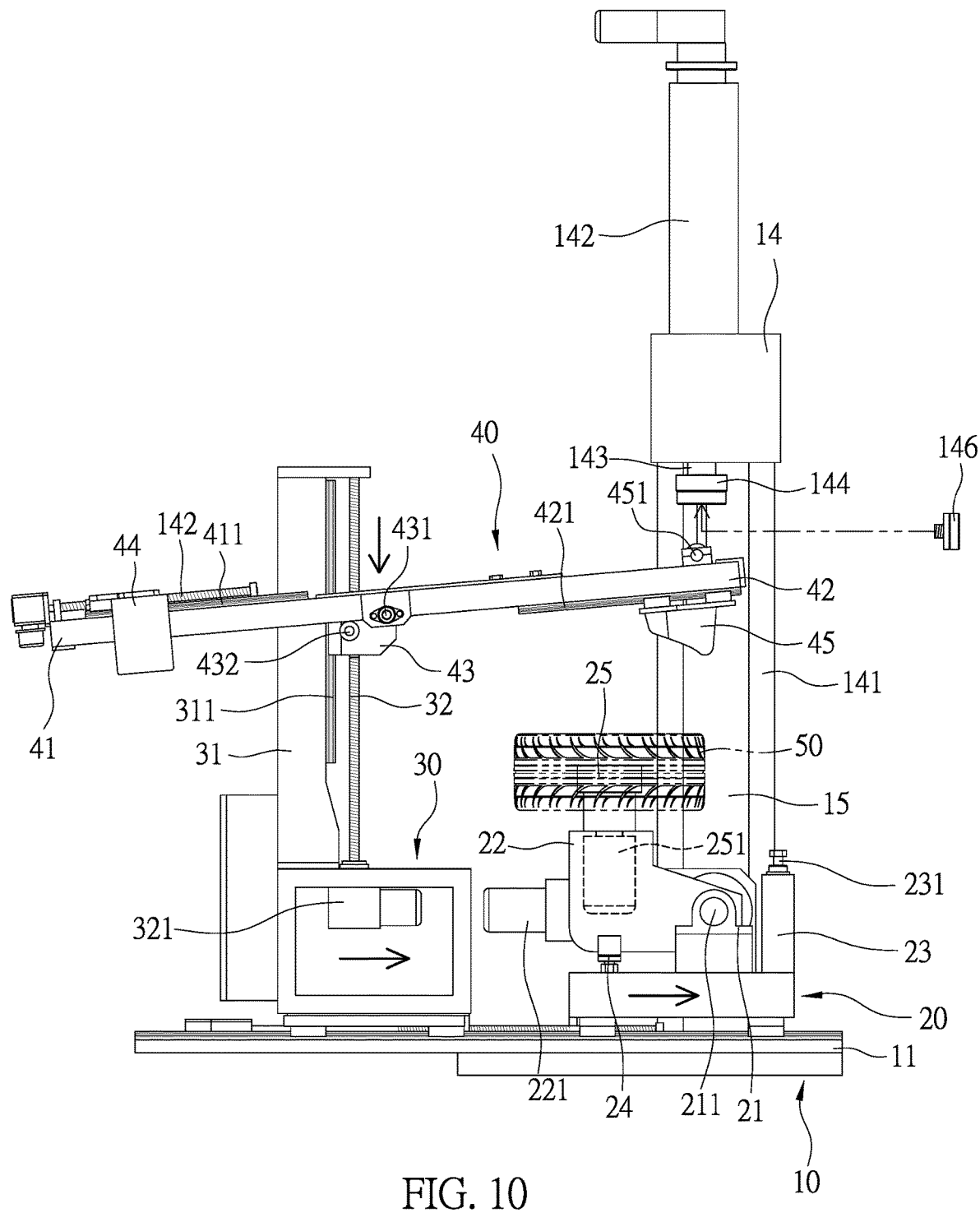
FIG. 10 is a schematic drawing of preforming the tire bead unseating test according to the present invention.
Figure 11:
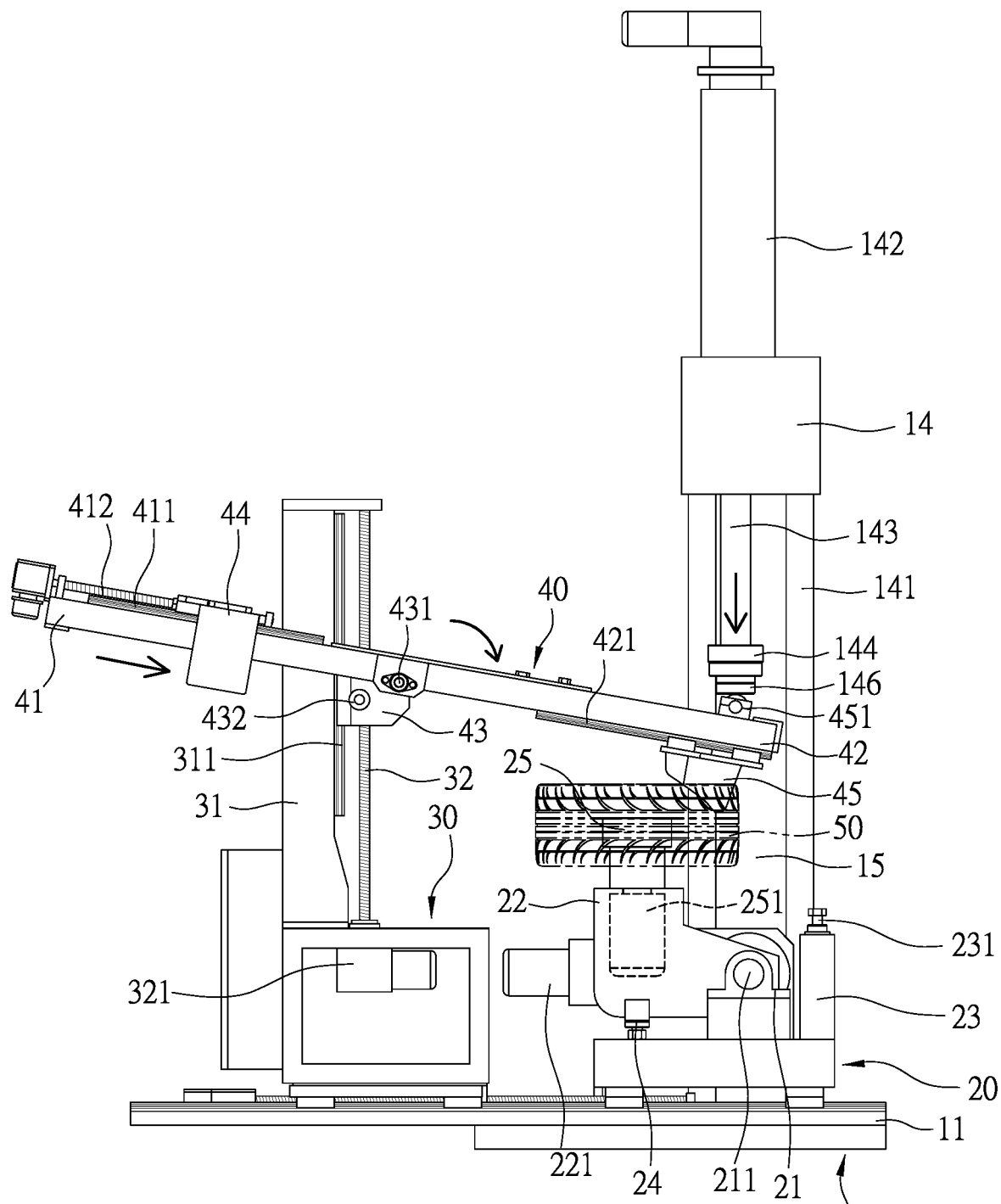
FIG. 11 is a schematic drawing showing the testing device pressing the brake arm down and abutting against the tire bead according to the present invention.
Figure 12:
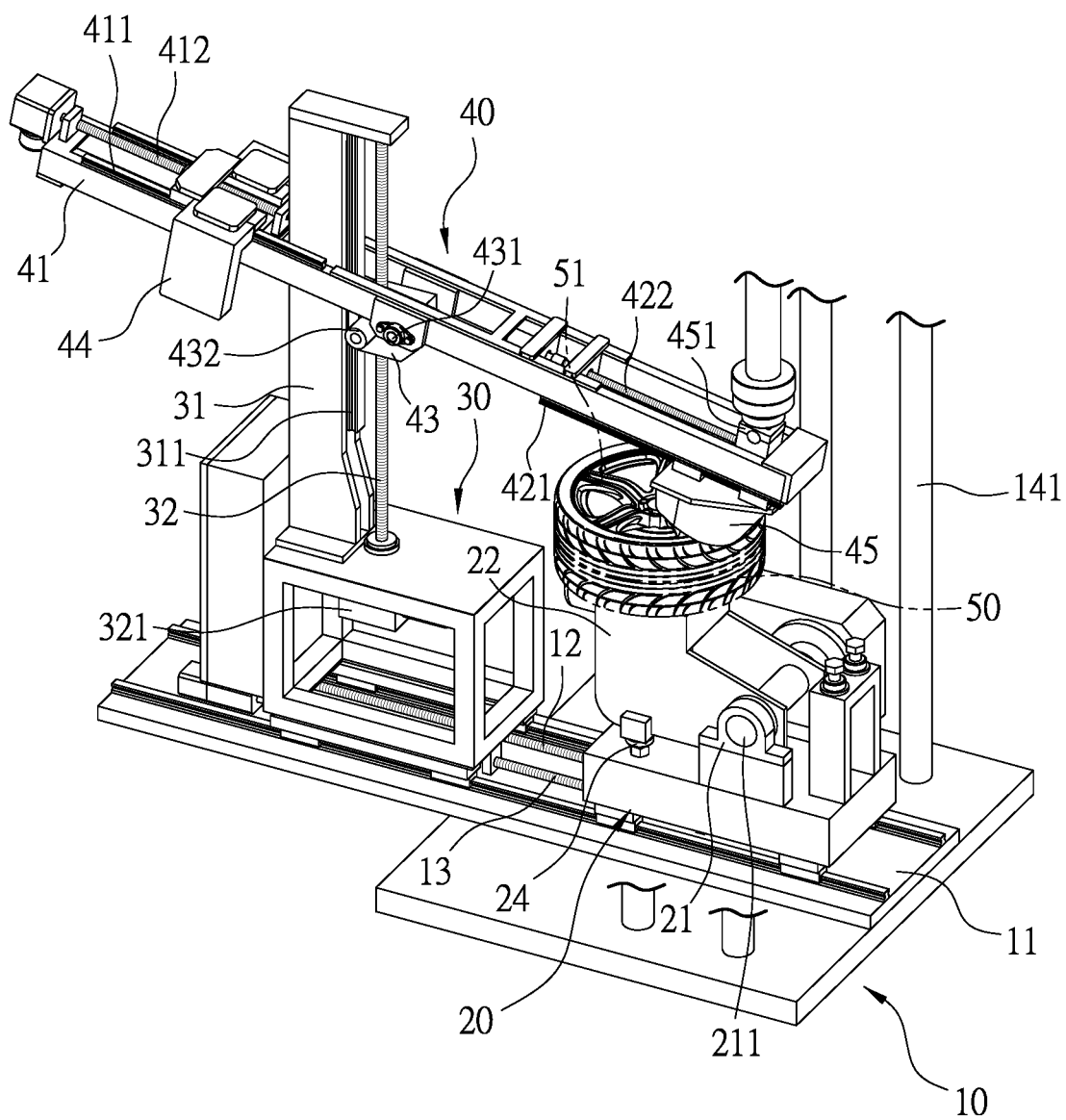
FIG. 12 is a perspective view of the testing device pressing the brake arm down and abutting against the tire bead according to the present invention.

First, please refer to FIGS. 1-5. A testing machine for tires comprises: a base 10, a first slider 20, a second slider 30 and a brake arm 40. The base 10 has a horizontal track 11, a first driving member 12, a second driving member 13, and a testing device 14 installed at an end of the horizontal track 11. The testing device 14 is supported by four support columns 141 above the horizontal track 11, and a testing space 15 is defined between the testing device 14 and the horizontal track 11. The testing device 14 comprises a longitudinal cylinder 142 and a telescopic rod 143 driven by the longitudinal cylinder 142, and a sensor 144 is mounted on an end of the telescopic rod 143 and has a probe needle 145 or a probe base 146 (as shown in FIGS. 8 and 9). The first slider 20 is slibably mounted on the horizontal track 11 of the base 10 and driven in the testing space 15 by the first driving member 12. The first slider 20 has a bearing housing 21 with an axial rod 211 connected to a L-shaped swing arm 22, and the L-shaped swing arm 22 is driven by a first driving motor 221 to swing through 90°. The bearing housing 21 further has a platform 23 with at least two first buffer cushions 231 at a top end and at least two second buffer cushions 24 on the first slider 20. An end of the L-shaped swing arm 22 towards the testing space 15 has a tire securing axis 25 and a second driving motor 251 driving the tire securing axis 25. The second driving motor 251 drives the L-shaped swing arm 22 to rotate the tire securing axis 25 to a horizontal or a vertical position. The second slider 30 is slibably mounted on the horizontal track 11 opposite the testing space 15 and driven by the second driving member 13, and the second slider 30 has a standing column 31 with a vertical track 311. The second slider 30 further has a screw 32 at an end parallel with the vertical track 311, and the screw 32 also has a third driving motor 321 at an end. The brake arm 40 has a counterweight end 41, an operating end 42 and the lift slider 43 between the counterweight end 41 and the operating end 42. The counterweight end 41 has a first rail 411, a third driving member 412 and a counterweight 44 connected to the third driving member 412 and moveable along the first rail 411. The operating end 42 has a second rail 421, a fourth driving member 422 and a bead unseating seat 45 connected to the fourth driving member 422 and moveable along the second rail 42. The bead unseating seat 45 is approximately semicircular and has a clamp 451. The lift slider 43 is mounted onto the brake arm 40 via an axis 431 such that the counterweight end 41 and the operating end 42 of the brake arm 40 are capable of swinging around the axis 431. The lift slider 43 is connected to the screw 32 and driven by the third driving motor 321 to move along the vertical track 311 of the standing column 31 to control movement of the brake arm 40. Furthermore, one end of the lift slider 43 has a limiting cross column 432 pushing against a bottom of the brake arm 40, and the limiting cross column 432 is disposed between the axis 431 and the counterweight end 41 and limits movement of the counterweight end 41.

Figure 1:
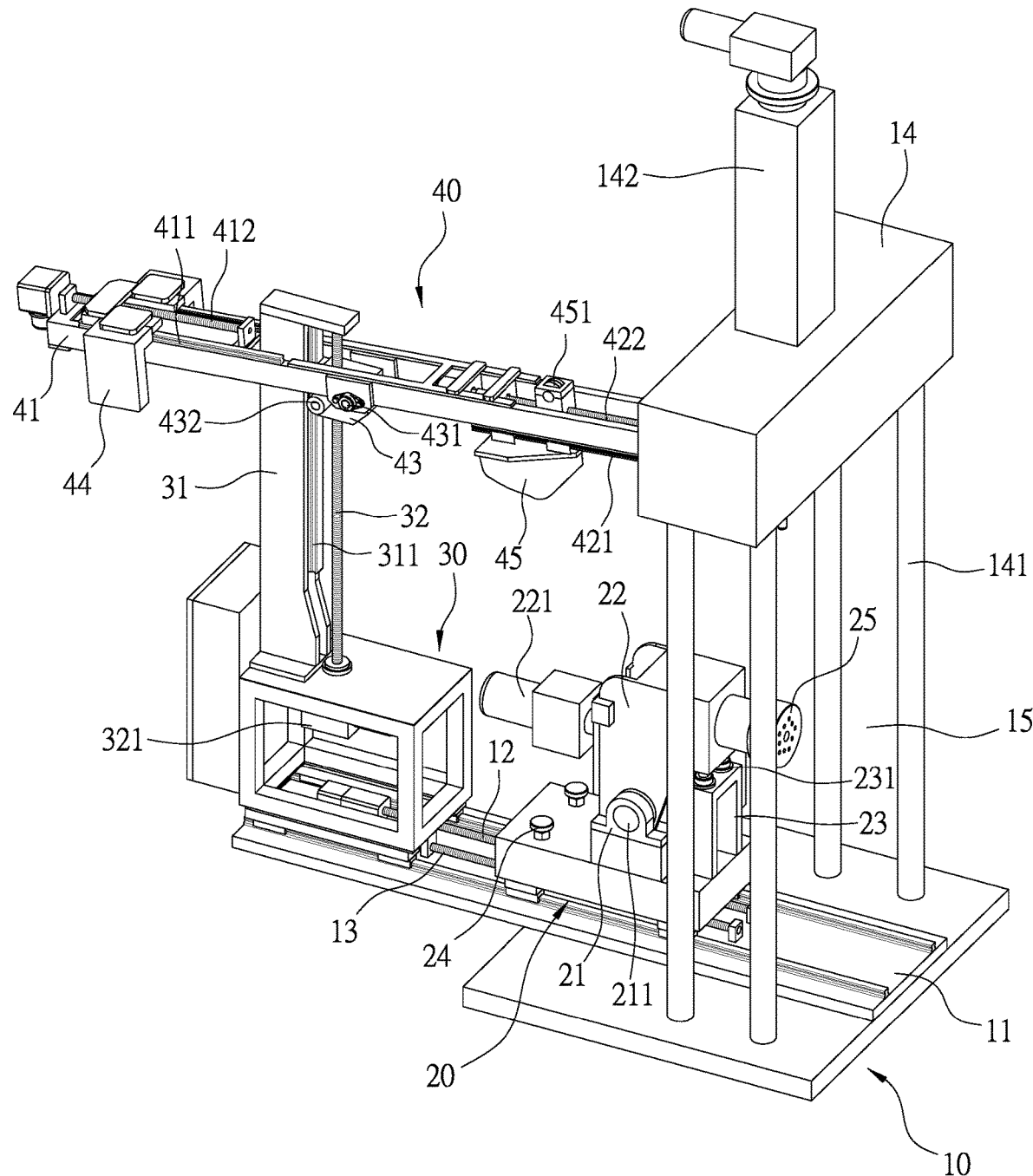
FIG. 1 is a perspective view of a preferred embodiment according to the present invention.
Figure 2:
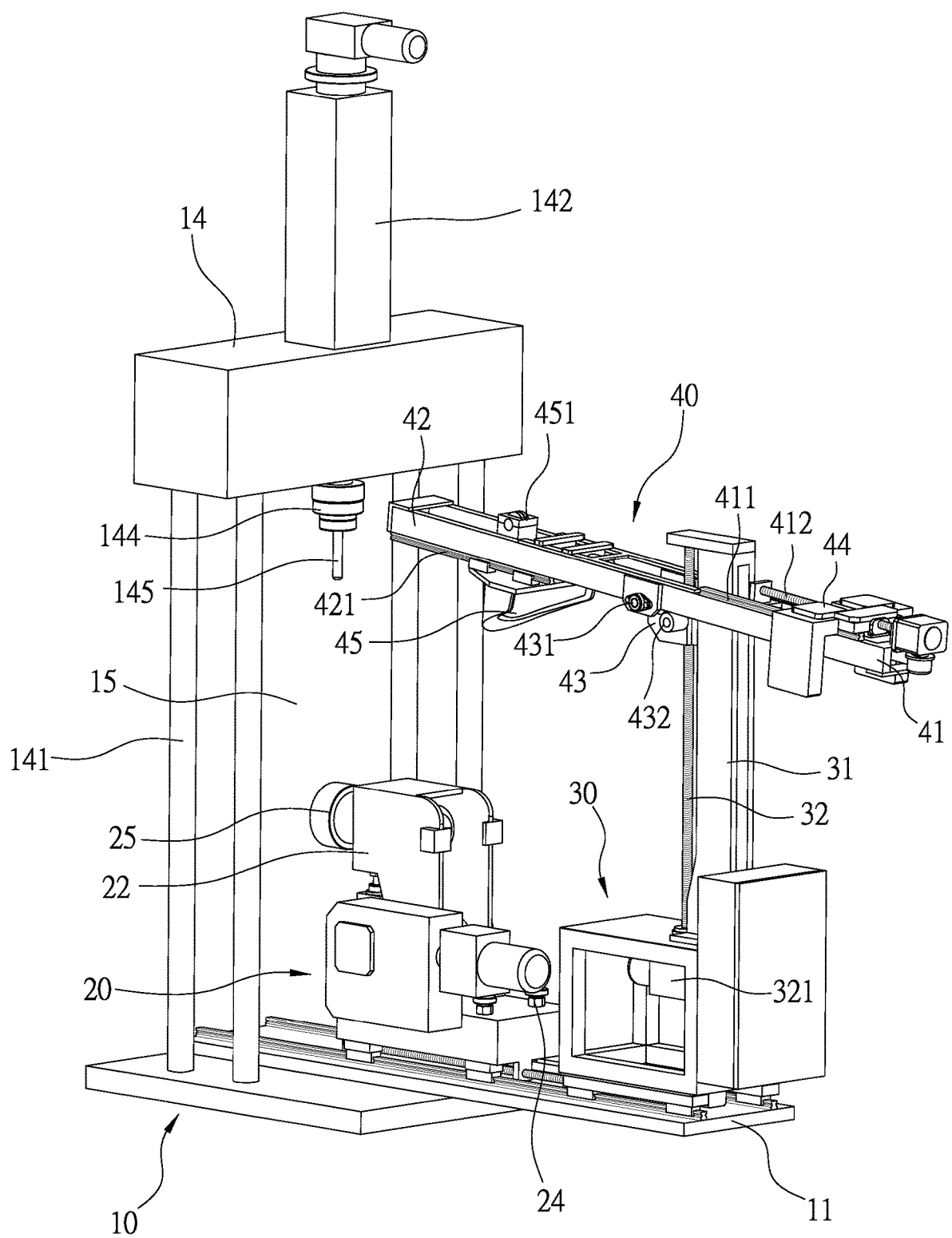
FIG. 2 is a perspective view of another angle of the preferred embodiment according to the present invention.
Figure 3:
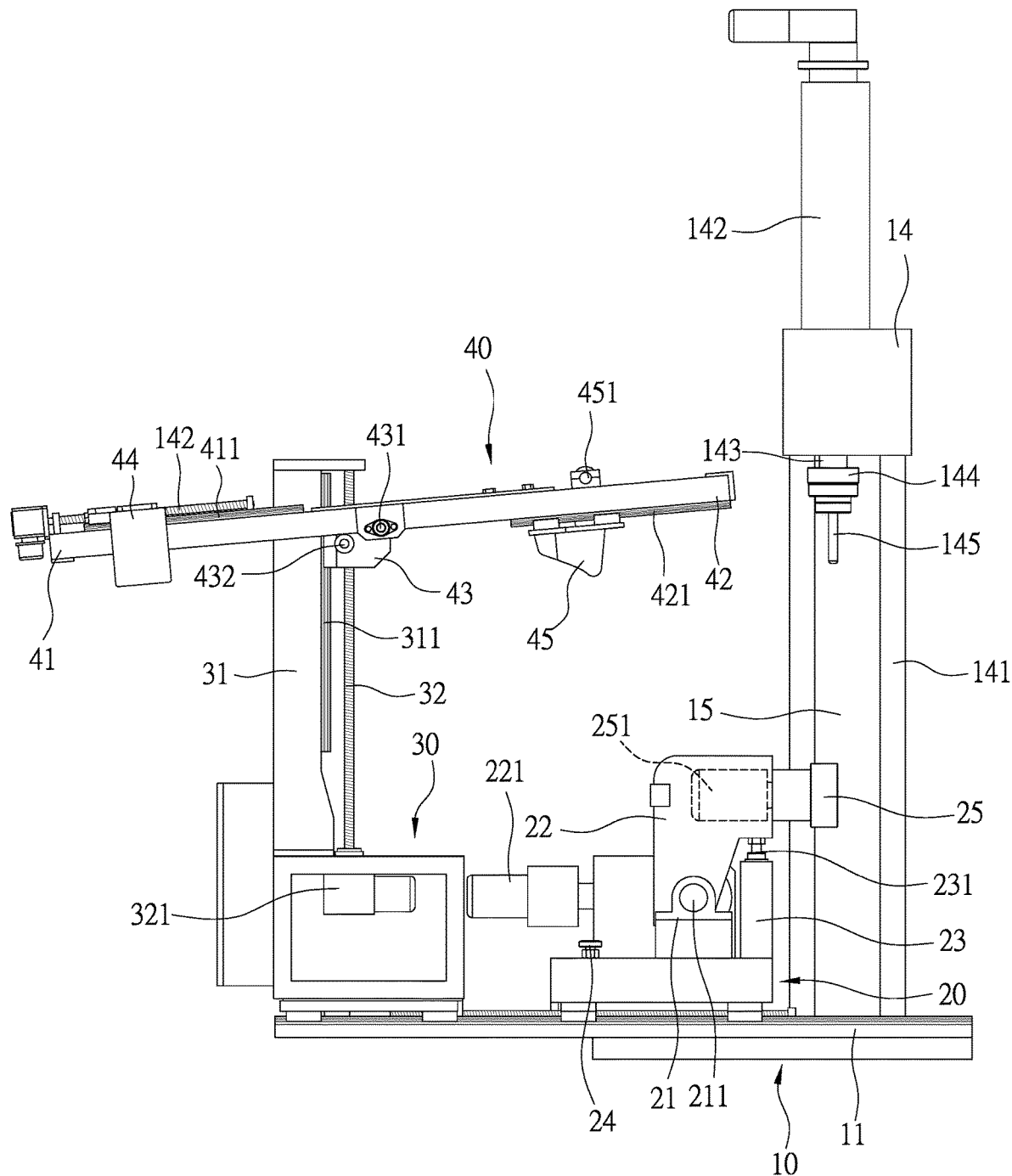
FIG. 3 is a side view of the preferred embodiment according to the present invention.
Figure 4:
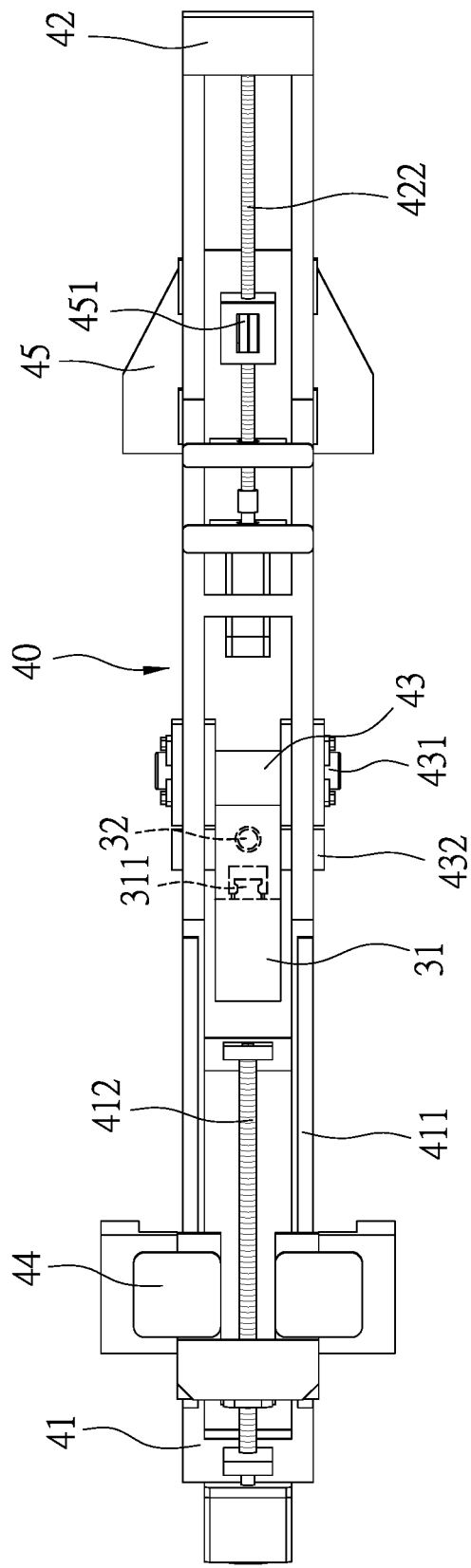
FIG. 4 is a top view of the brake arm of the preferred embodiment according to the present invention.
Figure 5:
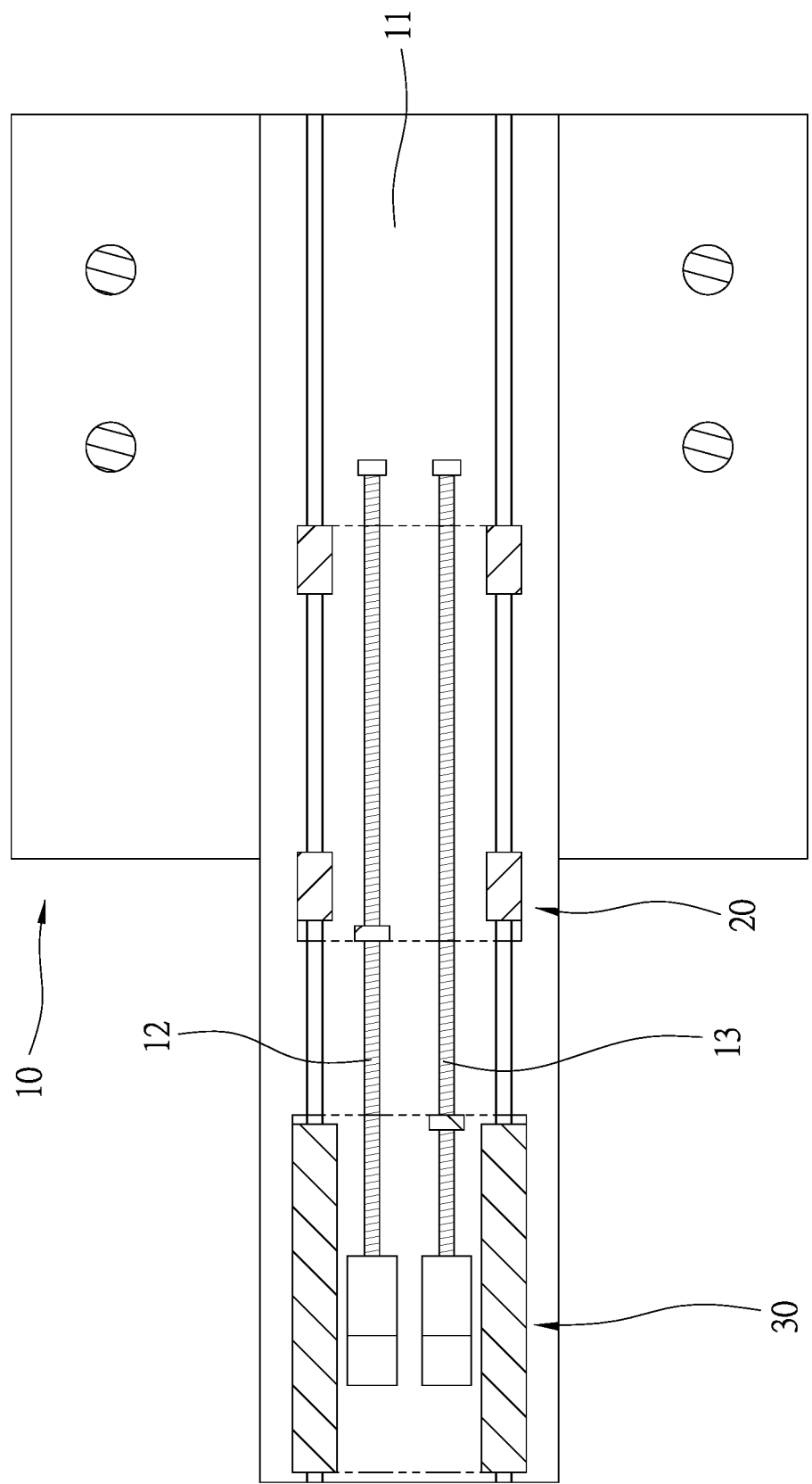
FIG. 5 is a schematic drawing of the base connecting the first and the second sliders of the preferred embodiment according to the present invention.
Figure 6:
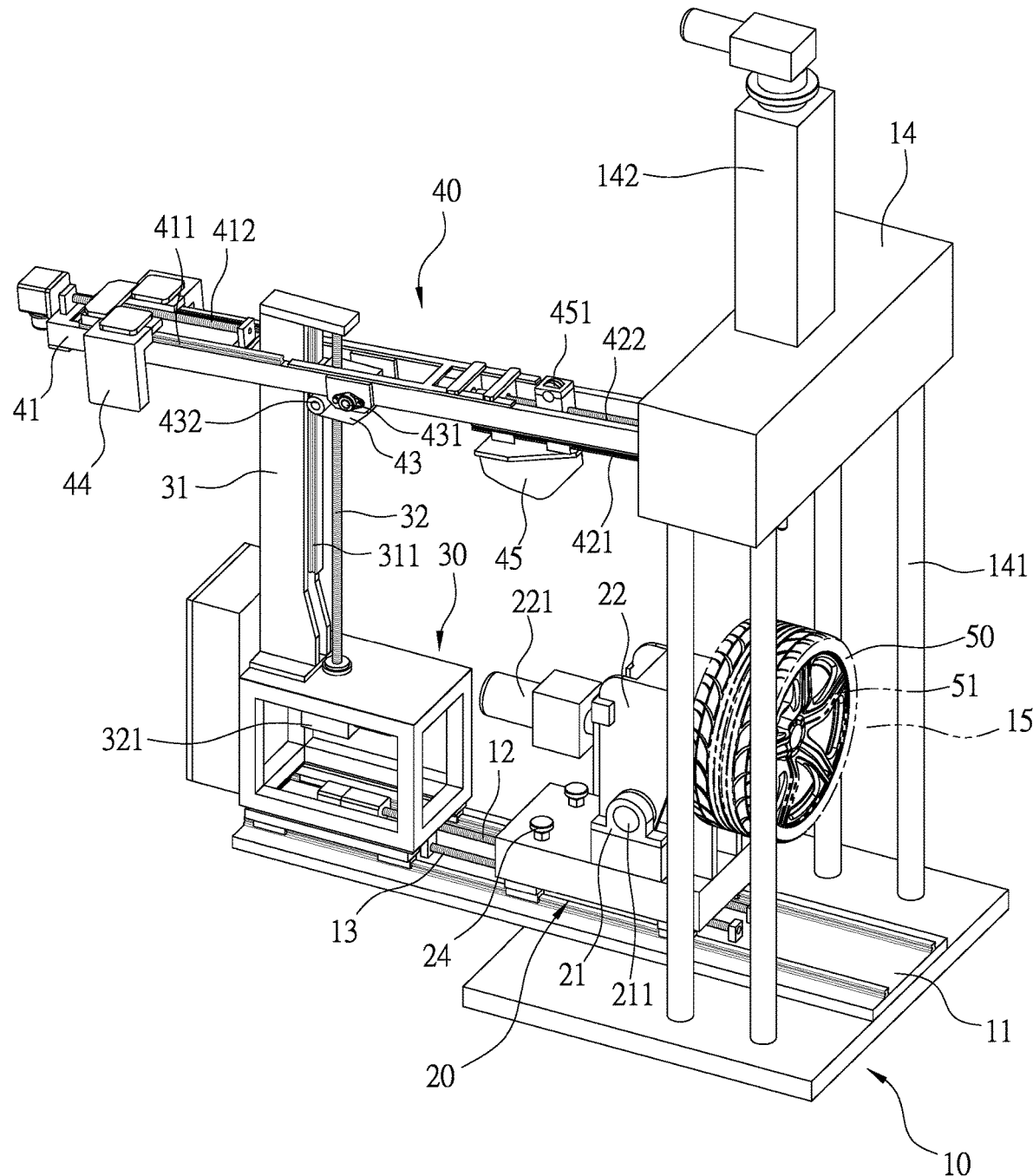
FIG. 6 is a perspective view of the rim installation state of the preferred embodiment according to the present invention.
Figure 7:
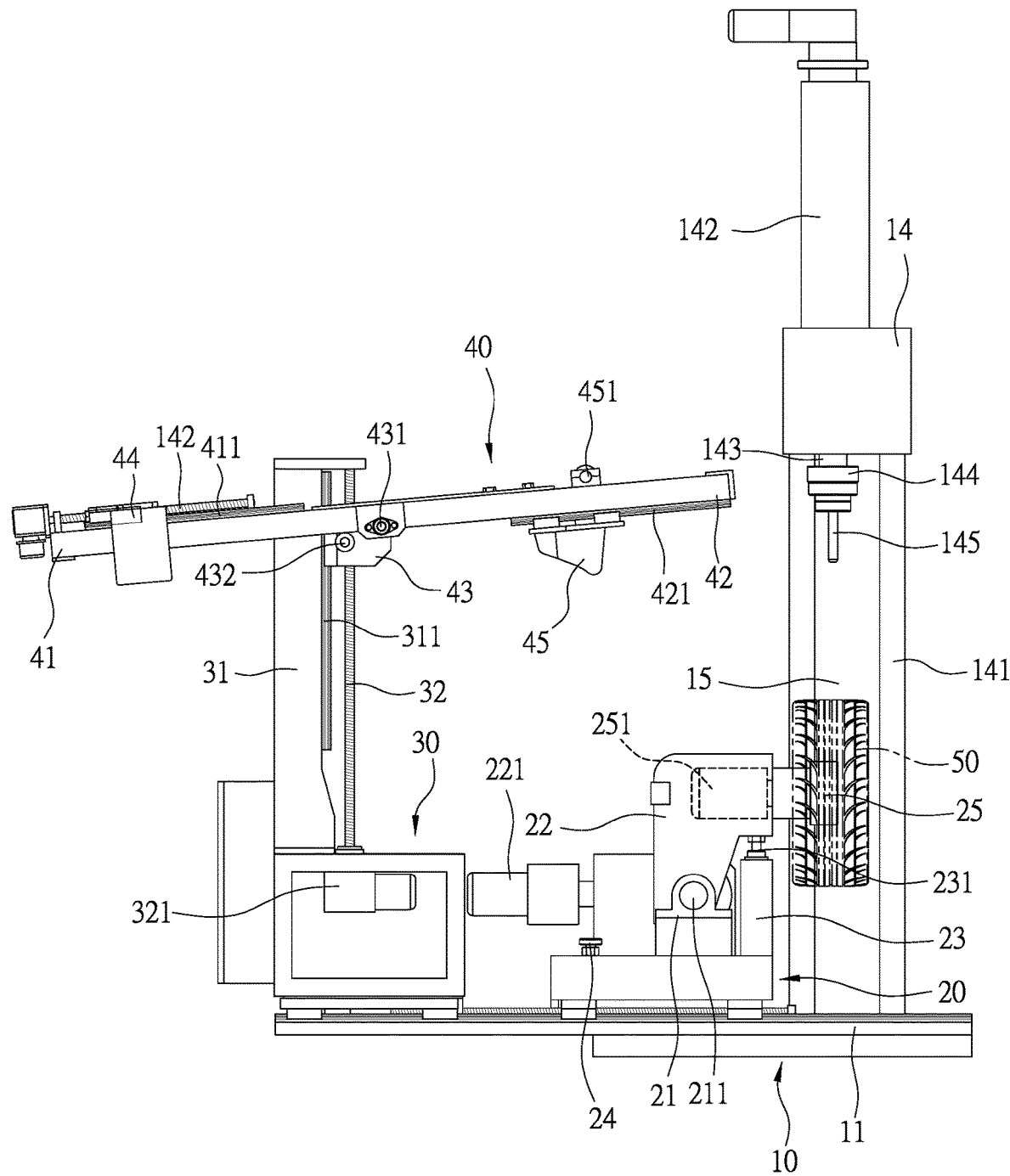
FIG. 7 is a schematic drawing of performing the plunger energy test according to the present invention.

The operation of the embodiment, please refer to FIGS. 1-2 with FIGS. 6-8. The present invention is used for testing tires, and the need to be tested tire 50 with a ring 51 is fixed on the tire securing axis 25 of the L-shaped swing arm 22, and the first driving motor 221 is used to control the L-shaped swing arm 22 to be upright and abutting against the first buffer pad 231 of the high platform 23, to make the tire axis 25 parallel to the horizontal track 11. Therefore, the tire 50 on the tire securing axis 25 faces upward, and then the first driving member 12 drives the first slider 20 to move along the horizontal track 11, and then the tire 50 is pushed into the testing space 15 and relatively positioned below the telescopic rod 143 of the testing device 14 to perform the tire tread test. The longitudinal cylinder 142 controls the telescopic rod 143 to descend and the probe needle 145 to presses down against the tread of the tire 50 to test the rigidity and strength of the tread and the sidewall of the tire 50, and at the same time obtains the pressure data of the test through the sensor 144, and further obtains proper tread rigidity and strength satisfied the requirement of the plunger of the tire 50. In addition, the second driving motor 251 can drive the tire securing axis 25 to rotate, to obtain the test data of other tread positions of the tire.

Another embodiment of the structure, please continue to refer to FIGS. 1 and 2 with the FIGS. 9, 10, 11, and 12. The L-shaped swing arm 22 is driven by the first driving motor 221 to swing 90° to form a horizontal state and press against the second buffer cushions 24, so that the tire securing axis 25 is vertical to the horizontal track 11 and the sidewall of the tire 50 on the tire securing axis 25 faces upwards. Then, the first driving member 12 drives the first slider 20 along the horizontal track 11 to enter into the testing space 15, to place the tire 50 under the telescopic rod 143 of the testing device 14, and perform a test on the bead of the tire 50, also the probe needle 145 of the sensor 144 is replaced by the probe base 146. Next, the third driving motor 321 drives the screw 32 to rotate to drive the lift slider 43 and the brake arm 40 to move down along the vertical track 311 of the standing column 31 to be lower than the testing device 14. Meanwhile, the second driving member 13 drives the second slider 30 to move along the horizontal track 11 toward the testing device 14, and the operating end 42 of the brake arm 40 moves into the testing space 15, then the fourth driving member 422 drives the bead unseating seat 45 along the second rail 421 to align the bead unseating seat 45 between the tire 50 and the telescopic rod 143. Afterward, the third driving member 412 drives the counterweight 44 to move toward to the lift slider 43, to make the operating end 42 of the brake arm 40 sinks naturally and the bead unseating seat 45 rests against the bead of the tire 50. Finally, the longitudinal cylinder 142 controls the telescopic rod 143 to descend and the top seat 146 presses down against the bead unseating seat 451 of the bead unseating seat 45, and then the bead unseating seat 45 is pressed down to test the resistance of the bead of the tire 50 and obtain the pressure data of the bead of the tire 50 through the sensor 144, so as to analyze the resistance of the bead of the tire 50 to de-lipping and know the side pressing force that causes the tire bead to break away from the rim causing leaking. In addition, the second driving motor 251 can drive the tire securing axis 25 to rotate, so as to obtain the test data of the other bead position of the tire.

The brake arm 40 drives the counterweight 44 and the bead unseating seat 45 via the third driving member 412 and the fourth driving member 422 electronically, which helps to improve the accuracy of the balance control of the brake arm 40. Before the delipping test of the tire 50 is performed, the counterweight 44 moves along the first rail 411 toward the counterweight end 41, and the bead unseating seat 45 moves along the second rail 421 toward the lift slider 43, such that the counterweight end 41 of the brake arm 40 is heavier than the operating end 42 and sinks naturally. Furthermore, the limiting cross column 432 abuts against the brake arm 40 to prevent the counterweight end 41 from sinking excessively and causing the tilting angle of the operating end 42 too high, which further reduces the operation steps and time of the delipping test and improves the operation efficiency and the accuracy of the test results of the tire testing machine.

With the structure of the above-mentioned specific embodiment, the following benefits can be obtained: the tire testing machine of the present invention can carry out the tests for the tread and bead of the tire together, and then obtain the test data of the tire plunger requirement and the delipping ability, which can effectively reduce the time and labor costs for tire replacement and transfer, thereby improving tire test efficiency, and helping to improve the accuracy of test data integration and analysis. It can also reduce the cost of purchasing the machine and the worries about the space for placing the machine, which has the substantial effect of practicality and convenience.

Although the present invention has been explained in relation to its preferred embodiment, it is to be understood that many other possible modifications and variations can be made without departing from the spirit and scope of invention as hereinafter claimed.

What is claimed is:

1. A testing machine for tires comprising:

a base having a horizontal track, a first driving member, and a second driving member, a testing device installed at an end of the horizontal track; the testing device supported by a plurality of support columns above the horizontal track, a testing space defined between the testing device and the horizontal track; the testing device comprising a longitudinal cylinder and a telescopic rod driven by the longitudinal cylinder, a sensor mounted on an end of the telescopic rod and having a probe needle or a probe base;

a first slider slibably mounted on the horizontal track of the base and driven in the testing space by the first driving member, the first slider having an L-shaped swing arm and a first driving motor capable of making the L-shaped swing arm to swing through 90°; an end of the L-shaped swing arm having a tire securing axis, and a second driving motor driving the tire securing axis, the second driving motor capable of driving the L-shaped swing arm to rotate the tire securing axis to a horizontal or a vertical position;

a second slider slibably mounted on the horizontal track opposite the testing space and driven by the second driving member, the second slider having a standing column with a vertical track, the second slider further having a screw at an end parallel with the vertical track, the screw having a third driving motor at an end; and a brake arm having a counterweight end, an operating end and a lift slider between the counterweight end and the operating end; the counterweight end having a first rail, a third driving member, and a counterweight connected to the third driving member and moveable along the first rail; the operating end having a second rail, a fourth driving member and a bead unseating seat connected to the fourth driving member and moveable along the second rail, the bead unseating seat having a clamp; the lift slider mounted onto the brake arm via an axis, such that the counterweight end arm and the operating end of the brake are capable of swinging around the axis, the lift slider connected to the screw and driven by the third driving motor to move along the vertical track of the standing column to control movement of the brake arm.

2. The testing machine for tires as claimed in claim 1, wherein the first slider has a bearing housing with an axial rod connected to the L-shaped swing arm, and the bearing housing further has a platform with at least two first buffer cushions at a top end and at least two second buffer cushions on the first slider.

3. The testing machine for tires as claimed in claim 1, wherein one end of the lift slider has a limiting cross column pushing against a bottom of the brake arm, and the limiting cross column is disposed between the axis and the counterweight end and limits movement of the counterweight end.

* * * * *